Sept. 15, 1970                 R. A. LEE                 3,528,297

DOUBLE CANTILEVER ACCELEROMETER

Filed Aug. 16, 1968

RICHARD A. LEE
INVENTOR

BY H. M. Saragovitz
E. J. Kelly
H. Berl
and J. J. Swartz
ATTORNEYS

United States Patent Office 3,528,297
Patented Sept. 15, 1970

3,528,297
DOUBLE CANTILEVER ACCELEROMETER
Richard A. Lee, Warren, Mich., assignor to the United States of America as represented by the Secretary of the Army
Filed Aug. 16, 1968, Ser. No. 753,134
Int. Cl. G01p *15/08*
U.S. Cl. 73—517    10 Claims

ABSTRACT OF THE DISCLOSURE

A double cantilever accelerometer including a beam supported at its midpoint by line contact with a support member. Recesses are formed in the support member to receive acceleration detectors which are secured at the midpoint of the beam.

---

The invention described herein may be manufactured, used, and licensed by or for the Government for governmental purposes without payment to me of any royalty thereon.

This invention relates to accelerometers and more particularly to structure for increasing the sensitivity of an accelerometer.

Accelerometers are old and well known and the general principle of operation of these instruments generally includes a balanced bridge of strain gauges whose resistances vary directly with the induced acceleration. These varying resistances are then recorded electrically from the corresponding voltage drops they produce, hence, giving an indication of the accelerations sustained. These standard accelerometers, however, lack a large amount of sensitivity due to their design, which, in the case of cantilever equipped accelerometers, prevents the placement of the strain gauges at the point of maximum bending moment. In the case of a single cantilever beam for instance, the maximum bending moment will occur at the junction of the beam and the support wall. In such case, the wall interferes with the placement of an acceleration detection device at the point that maximum strain is obtained.

In the past, increased sensitivity has been obtained by the use of amplifiers which are connected to the output of the acceleration devices. Among other reasons, these have proven unsatisfactory because of the decreased signal to noise ratio. If the output of the strain gauges is small due to poor sensitivity, a low signal to noise ratio will result. One of the other prior art methods of achieving increased sensitivity is reduction in the width of the beam at a particular point, however, this has been proven to be unsatisfactory because of the decreased frequency response resulting therefrom.

According to the present invention, these acceleration sensing devices are placed on the beam at its point of maximum bending moment. A support means is provided to engage the beam intermediate the spaced ends of the beam and at the point of the maximum bending moment. This support means is such as to form first and second line contact with the oppositely disposed surfaces of the beam.

Other advantages of the present invention will become apparent to those of ordinary skill in the art by the following description when considered in relation to the accompanying drawing of which:

Figure 1:
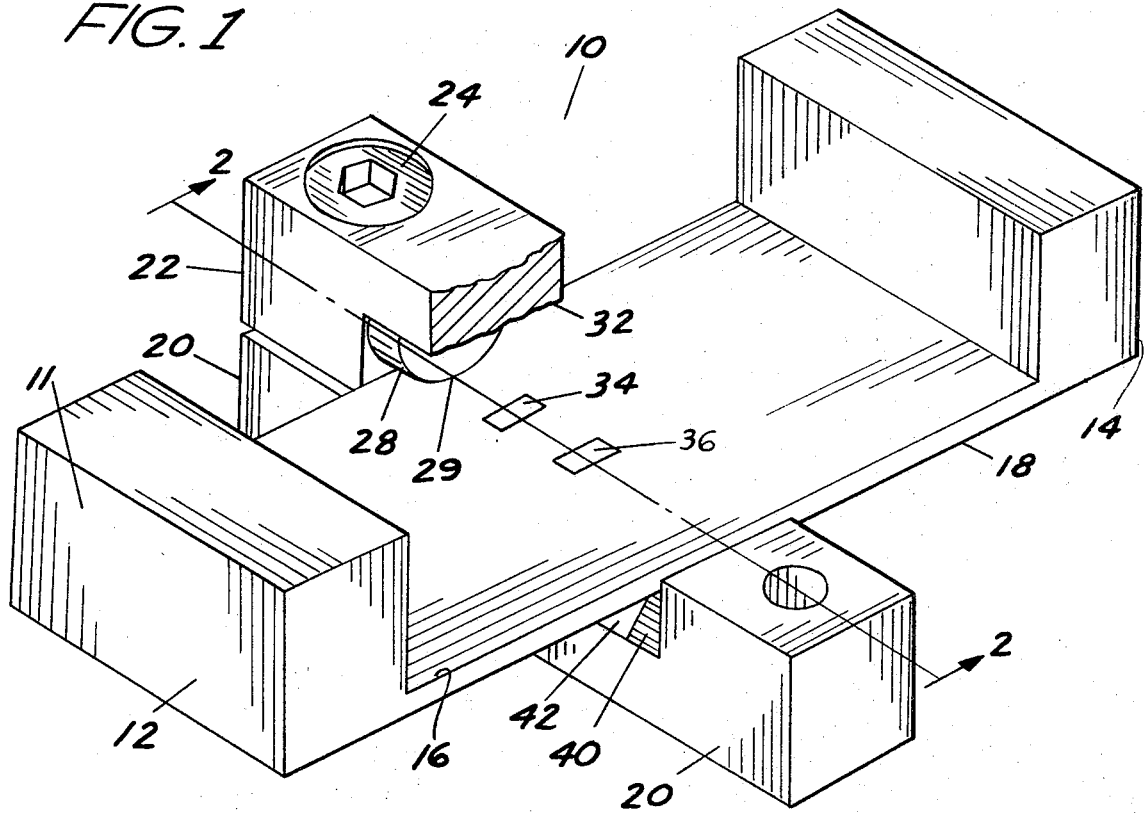
FIG. 1 is a perspective view of the accelerometer with parts broken away.
Figure 2:
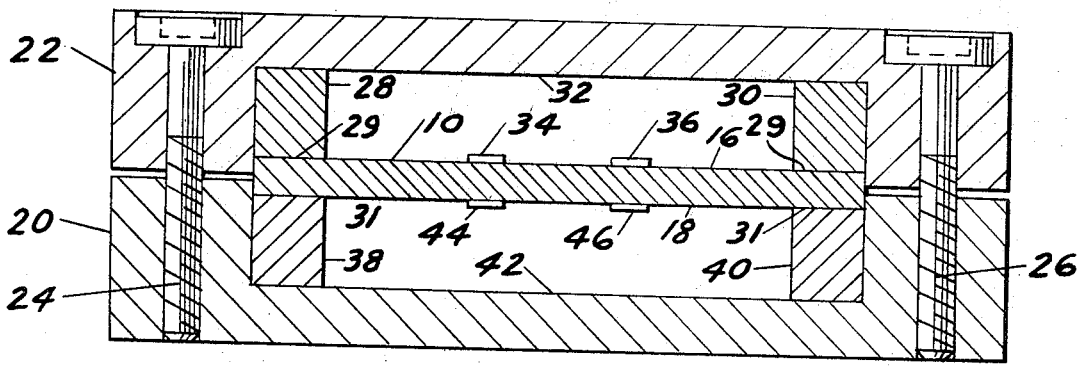
FIG. 2 is a cross sectional view taken along lines 2—2 of FIG. 1.

Referring now to the drawing wherein similar numerals will be referred to similar parts in the various figures, a beam 10 is shown having a mass 11 connected wth its first and second spaced apart ends 12 and 14. Although the masses 11 are shown connected with the first upper surface 16 of the beam, they could as well be connected with the second lower surface 18 of the beam. As opposed to a single cantilever beam which is free at one end and fixed or built in at the other, a double cantilever beam is free at both ends and fixed therebetween.

The support member for the beam includes first and second bars 20 and 22 which are secured together by any suitable means such as bolts 24 and 26. Bar 22 includes first and second curved portions 28 and 30 which engage the upper surface 16 of bar 10 by means of a line contact 29. A recess 32 is formed intermediate curved portions 28 and 30 to recive acceleration detection means 34 and 36. Similarly, bar 20 has curved portions 38 and 40 engaging the lower surface 18 of beam 10 and a recess 42 formed betweeen the curved portions. Curved portions 38 and 40 form a second line contact 31 with lower surface 18. A pair of acceleration detection means 44 and 46 are bonded to the lower surface 18 and located within recess 42.

Acceleration detection means 34, 36, 44, and 46 comprise force responsive sensors, preferably electrical strain gauges. The sensors 34, 36, 44, and 46 are positioned on beam 10 so as to intersect a plane including the first and second line contacts between the beam 10 and curved portions 28, 30, 38 and 40.

The combination of curved portions 28 and 38 form a first clamp on the edge of beam 10 whereas curved portions 30 and 40 form a clamp on the opposite side of beam 10 to hold it in a rigid horizontal position. The curved portions 28, 30, 38, and 40 provide self aligning of the beam in the horizontal position. While bars 20 and 22 are brought near to each other by bolts 24 and 26, the curved surfaces 28 and 30 form a couple on one side of beam 10 while the curved surfaces 30 and 40 form a couple on the other side of beam 10. If the beam is centered so that the upper and lower line contacts are formed midway between ends 12 and 14 of beam 10, this coupling force exerted on opposite surfaces 16 and 18 will align the beam in a horizontal position. Although the support member may engage the beam at any point intermediate its oppositely spaced ends, it is preferable that the line contacts formed by the curved portions of the bars and beam 10 be located midway between the opposite ends 12 and 14 of beam 10. It is at this point that the maximum bending moment will occur. The slope at this point, however, will be a minimum as the slope will not change since the beam is not rotating at this point. In this regard, the double cantilever is analogous to the clamped cantilever.

Figure 3:
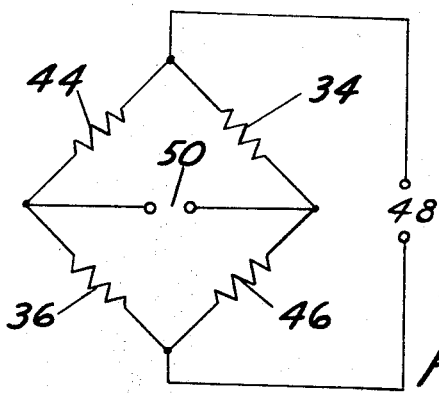
FIG. 3 is a circuit diagram incorporating the sensing elements of the accelerometer.

The force responses sensors 34, 36, 44, and 46 are connected by suitable conductors in a circuit forming a Wheatstone bridge containing a suitable source of electrical power 48 as illustrated in FIG. 3. As illustrated in the drawing, the adjacent sensors in the bridge circuit are located on opposite sides of the beam to provide increased sensitivity. The strain occurring in the fibers at the top surface 16 of beam 10 will be opposite to the strain experienced by the fibers in the bottom surface 18, hence, when the stress sensors on the top part are subjected to a compressive force the sensors on the bottom will be subjected to a tension force. A meter or other similar output indicating device is connected at 50 across the opposite corners of the electrical bridge circuit. When the device is not subjected to force, the resistances of the strain gauges will be equal and the voltage thereacross will also be equal, hence, no current will flow through output device 50. When the resistances are unequal, the meter 50 will provide an indication proportional to the voltage drop across the bridge resistors.

In operation, supporting bars 20 and 22 are normally connected to a device which will be subjected to an external force or vibration. When the support 20 and 22 containing the cantilever is subjected to this vibration, the vibration is transmitted thru the support to the cantilever 10. Assuming for example that the bars 20 and 22 are subjected to an upward force is shown in the diagram, the beam 10 experiences a downward inertial force that bends the cantilever in such a way as to produce tension in strain gauges 34 and 36 and compression in strain gauges 44 and 46. This tension increases the resistance of sensors 34 and 36 while the compression decreases the resistance of strain gauges 44 and 46. A change in resistance causes the previously balanced circuit to become unbalanced and an output will be produced at 50. As will readily be apparent, if the bars 22 and 24 are subjected to a downward oscillation, the effect on sensors 34, 36, 44 and 46 will be exactly opposite to that experienced during an upward movement and therefore requires no further explanation.

Hence, it can be seen that by the new and improved beam structure in conjunction with the new and improved means of mounting the beam and the acceleration devices thereon, an accelerometer has been produced which will provide significantly increased sensitivity over prior art of accelerometers.

Since it is obvious that many changes and modifications can be made in the above-described details without departing from the nature and spirit of the invention, it is to be understood that the invention is not limited to said details except as set forth in the appended claims.

What I claim is:
1. A double cantilever accelerometer comprising:
    a beam having first and second oppositely disposed surfaces intermediate first and second spaced apart ends:
    support means for forming first and second line contacts transverse to said beam with said first and second oppositely disposed surfaces of said beam, thereby forming the support for said beam; and
    detection means secured to at least one of said surfaces intersecting a plane including said first and second line contacts, said detection means responsive to bending of the cantilever in the vicinity of said line contacts for detecting acceleration of said support means.
2. A double cantilever accelerometer as set forth in claim 1 wherein said detection means comprises bending moment responsive sensors secured to at least one surface of said beam and intersecting a plane including said first and second line contacts.
3. A double cantilever accelerometer as set forth in claim 2 wherein first and second portions of said bending moment responsive sensors are secured to said first and second surfaces respectively of said beam, said first and second portions of said sensors intersecting a plane including said first and second line contacts.
4. A double cantilever accelerometer as set forth in claim 1 wherein said support means includes first and second clamps each including first and second curved surfaces engaging said first and second surfaces respectively of said beam.
5. A dobule cantilever accelerometer as set forth in claim 4 wherein said curved surfaces are cylindrical.
6. A double cantilever accelerometer as set forth in claim 1 wherein said support means includes first and second bars each including first and second spaced apart curved portions and a recessed portion formed therebetween,
    said first and second curved portions of said first bar forming said first line contact with said first surface
    said first and second curved portions of said second bar forming said line contact with said second surface of said beam.
7. A double cantilever accelerometer as set forth in claim 6 wherein said first and second curved portions are cylindrically shaped.
8. A double cantilever accelerometer as set forth in claim 6 wherein said detection means comprises bending moment responsive sensors secured to at least one surface of said beam and intersecting a plane including said first and second line contacts.
9. A double cantilever accelerometer as set forth in claim 8 wherein said first and second bars are connected together on opposite sides of said beam and said first and second line contacts are formed midway between said spaced apart ends of said beam.
10. A double cantilever accelerometer comprising:
    a beam having first and second spaced apart ends and first and second surfaces intermediate said ends;
    a first pair of strain gauges mounted on said second surface midway between said ends of said beam;
    a second pair of strain gauges mounted on said second surface midway between said ends of said beam;
    a support member comprising:
        first and second bar members secured together, said first and second bar members each including two spaced apart curved portions with a recess formed therebetween, said curved portions of said first and second bars engaging said first and second surfaces respectively of said beam midway between said oppositely spaced ends in line contact transverse to said beam so that said first and second pairs of strain gauges are positioned in said first and second recess respectively thereby enabling said strain gauges to detect the maximum bending moment of said beam.

References Cited

UNITED STATES PATENTS 3,120,622   2/1964   Dranetz et al. _____ 73—517

JAMES J. GILL, Primary Examiner

H. GOLDSTEIN, Assistant Examiner

U.S. Cl. X.R.

73—141